(12) United States Patent
Hupont et al.

(10) Patent No.: US 8,759,768 B2
(45) Date of Patent: Jun. 24, 2014

(54) DEVICE FOR MEASURING PHYSICAL QUANTITIES OF NUCLEAR MATERIALS AND METHOD OF EMPLOYING SUCH A DEVICE

(75) Inventors: Nicolas Hupont, Pierrevert (FR); Philippe Bernard, Alleins (FR); Jean-Francois Mante, Bagnols sur Ceze (FR); Jean-Pierre Coulon, Meyrargues (FR); Nicolas Saurel, Varois et Chaignot (FR)

(73) Assignee: Commissariat a l'Energie Atomique et Aux Energies Alternatives, Paris (FR)

( * ) Notice: Subject to any disclaimer, the term of this patent is extended or adjusted under 35 U.S.C. 154(b) by 557 days.

(21) Appl. No.: 13/002,600

(22) PCT Filed: Jul. 10, 2009

(86) PCT No.: PCT/EP2009/058839
§ 371 (c)(1),
(2), (4) Date: Mar. 15, 2011

(87) PCT Pub. No.: WO2010/004033
PCT Pub. Date: Jan. 14, 2010

(65) Prior Publication Data
US 2011/0155920 A1    Jun. 30, 2011

(30) Foreign Application Priority Data

Jul. 10, 2008  (FR) ..................................... 08 54715

(51) Int. Cl.
*G01T 1/167*    (2006.01)
*G21F 5/00*    (2006.01)

(52) U.S. Cl.
CPC .. *G01T 1/167* (2013.01); *G21F 5/00* (2013.01)
USPC .................. 250/338.1; 250/496.1; 250/506.1

(58) Field of Classification Search
CPC .................................. G01T 1/167; G21F 5/00
USPC ...................... 250/336.1, 506.1, 338.1, 496.1
See application file for complete search history.

(56) References Cited

U.S. PATENT DOCUMENTS 5,059,797 A * 10/1991 Bukowski .................. 250/336.1
5,274,239 A * 12/1993 Lane et al. ............... 250/370.01
(Continued)

FOREIGN PATENT DOCUMENTS

FR      1 515 024       10/1966
FR      2 654 219        5/1991
(Continued)

OTHER PUBLICATIONS

Preliminary Search Report issued Oct. 5, 2009, in French Patent Application No. PCT/EP2009/058839.
(Continued)

*Primary Examiner* — David Porta
*Assistant Examiner* — Gisselle Gutierrez
(74) *Attorney, Agent, or Firm* — Oblon, Spivak, McClelland, Maier & Neustadt, L.L.P.

(57) ABSTRACT

A movable device for measuring physical quantities of nuclear materials contained in a shielded cell, which device can be brought up against the shielded cell and can be retracted therefrom, the device configured to carry out the measurement in the position in which it is against the shielded cell. The device includes a carriage, a support member placed on the carriage, and a shielded container placed on the support member. The shielded container includes a transfer container configured to store the nuclear material to be measured, and an opening configured to be aligned with an opening in one wall of the shielded cell. The support member is made of graphite and includes a housing accommodating a neutron emission module, a casing covering the shielded container, the casing being made of graphite, and a neutron measurement mechanism fastened to the casing.

22 Claims, 11 Drawing Sheets

(56) References Cited

U.S. PATENT DOCUMENTS

| | | | |
|---|---|---|---|
| 6,252,923 B1* | 6/2001 | Iacovino et al. | 376/272 |
| 6,630,679 B1 | 10/2003 | Ottmar et al. | |
| 2005/0135536 A1 | 6/2005 | Lyoussi et al. | |
| 2006/0104400 A1* | 5/2006 | Lyoussi et al. | 376/159 |
| 2008/0135773 A1* | 6/2008 | Tickner et al. | 250/390.02 |

FOREIGN PATENT DOCUMENTS

| | | |
|---|---|---|
| GB | 1148816 | 9/1967 |
| JP | 61-239187 A | 10/1986 |
| JP | 2-31199 | 2/1990 |
| JP | 2-161340 A | 6/1990 |
| JP | 3-210493 A | 9/1991 |
| JP | 9-178862 A | 7/1997 |
| JP | 11-64528 | 3/1999 |
| JP | 2000-171564 | 6/2000 |
| JP | 2002-14194 | 1/2002 |
| JP | 2002-541491 A | 12/2002 |
| JP | 2007-155664 A | 6/2007 |
| WO | WO 00/08450 | 2/2000 |

OTHER PUBLICATIONS

Office Action issued Feb. 26, 2013 in Japanese Patent Application No. 2011-517172 with English language translation.

* cited by examiner

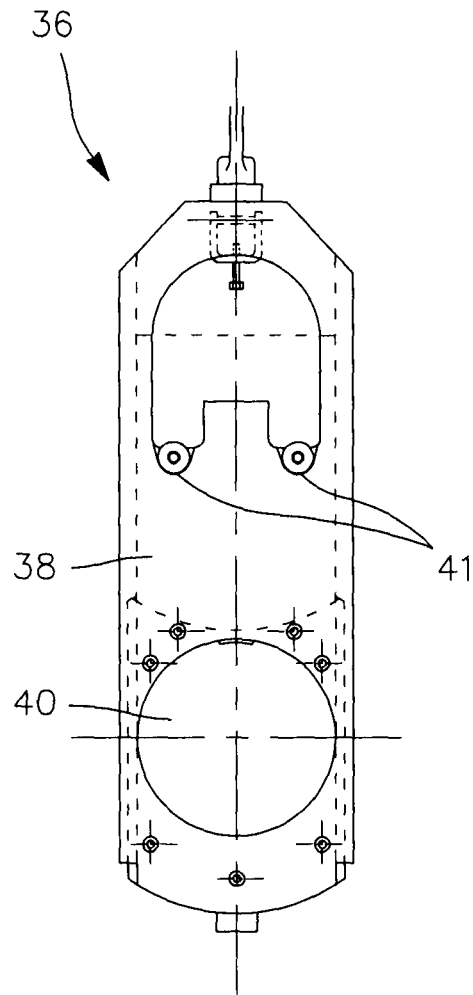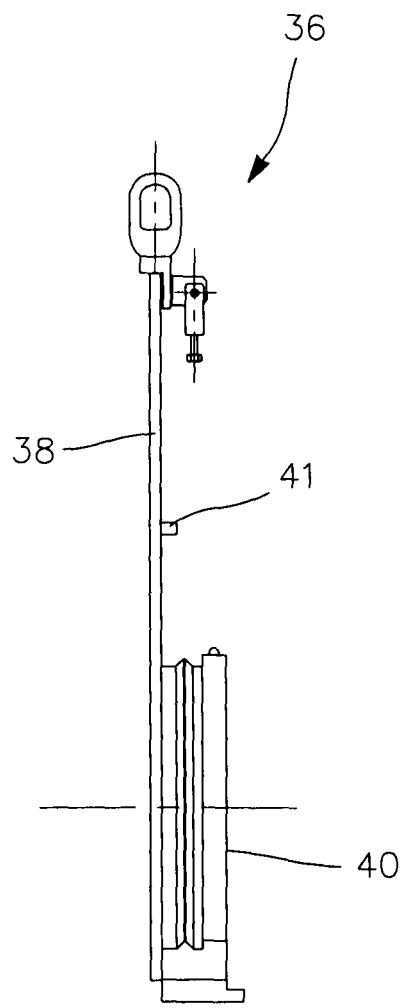
FIG. 3A                    FIG. 3B

DEVICE FOR MEASURING PHYSICAL QUANTITIES OF NUCLEAR MATERIALS AND METHOD OF EMPLOYING SUCH A DEVICE

TECHNICAL FIELD AND PRIOR ART

The present invention mainly relates to a device for measuring physical quantities of nuclear material, more particularly a device for determining the chemical or physical properties of nuclear materials by resorting to electromagnetic radiation or particles to induce through activation a secondary neutron emission. The present invention also relates to a method of employing such a device.

For example, for uranium (U), plutonium (Pu) and americium (Am), the physical quantities of quantitative type may be the masses, the spontaneous neutron emissions and induced neutron emissions, and of qualitative type, the multiplicity of spontaneous neutron emissions, the multiplicity of induced neutron emissions, the fissile nature of the materials and their isotopic composition.

When the nuclear materials are irradiating and/or contaminating, it is necessary respectively to use screens and/or to ensure their confinement to guarantee the protection of the personnel.

Nuclear installations thus comprise shielded cells in which the nuclear materials are processed or stored. The shielded cells are constituted of one or more sealed enclosures called caissons. The caisson or caissons is (are) surrounded by a radiological shielding also described as biological shielding.

The shielded cells are equipped with devices enabling the bringing together of transportable shielded containers in order to introduce or evacuate the nuclear materials while at the same time also ensuring the continuity of the protection of the personnel against irradiation and contamination.

It is necessary in the context of their processing or upon their evacuation to measure these nuclear materials. The one who requests these measurements may be the operator of the nuclear installation, but also external authorities such as the IAEA within the context of its control missions.

To carry out these measurements, these nuclear materials ordinarily have to be isolated.

In a known manner, the measurements to be performed on the nuclear materials are carried out at a distance from the shielded cells. To do this, the nuclear materials are extracted from the cell, they are isolated in a shielded container brought up against the shielded cell, then they are transferred to an installation dedicated to carrying out the measurements.

Yet, for regulatory and safety reasons, the nuclear material may only be evacuated from the shielded cell if it meets certain specifications, of which the quantity of fissile material. Yet, in the installations in place, no means exist to carry out this measurement in situ which makes it possible to guarantee that these specifications are met. Within a context of derogatory procedures, the evacuation of the nuclear material may be carried out, but at the price of numerous, complex, long and costly operations which present risks. Indeed, during the transport of the nuclear material, an accident could lead to a pollution of the exterior environment.

A device enabling the measurement of the dose rate of the nuclear material in a container is known from document FR 2 654 219, the device being brought up against the shielded cell.

This device comprises a transportation flask, of "Padirac" type, mounted on a transport table. This flask comprises a cylindrical housing containing a transfer container. When the transportation flask is brought up against the outside wall of the shielded cell, a door provided in the wall of the shielded cell is opened, a hatch provided on the transportation flask is also opened. Then by means of a connecting poker introduced via an opening formed in the bottom of the housing of the transportation flask, the transfer container is introduced into the shielded cell, in which it is loaded with nuclear material. The transfer container is then partially reintroduced into the housing of the transportation flask. For the measurement, a dose rate measuring probe is introduced via the orifice through which has been introduced the poker, after its withdrawal. The introduction of this probe into the housing thus prevents the transfer container being able to enter completely inside the transportation flask, and to close the hatch of the transportation flask.

This device provides a dose rate measurement, yet this physical quantity cannot be linked in an unequivocal manner to the physical quantities of the material present in the transfer container, without additional hypotheses on its physical-chemical nature. Moreover, the impossibility of being able to close the hatch of the transportation flask and thus to be able to isolate in a sealed manner the nuclear material to be measured from the rest of the shielded cell, hinders the measurement. Indeed, in this case the measured dose rate cannot be attributed exclusively to that of the material contained in the transfer container. It is disclosed in this document that, to avoid the measurements carried out inside the transportation flask being marred by errors resulting from the background noise coming from the shielded cell, it is possible to carry out, prior to the measurement of the dose rate, a measurement of the background noises also carried out by means of the probe introduced via the orifice through which is introduced the connecting poker.

This measuring device thus necessitates an additional measurement step, which lengthens the time required to obtain a reliable measurement of the nuclear materials. Moreover, this requires hypotheses to be made, which thus reduces the precision and the accuracy of the measurements.

Moreover, the fact of not being able to close the shielded cell imposes, over a certain time, having a reduced isolation of the nuclear material that it contains vis-à-vis the exterior environment.

Furthermore, the use of the orifice of the connecting poker for the passage of the probe requires this to be of complex design. Indeed, it comprises a large number of parts, these parts being mechanically linked to each other, which increases all the more the risks of failure.

Consequently, an aim of the present invention is to offer a measuring device offering a great ease of transport and use and a high safety of use, making it possible to carry out measurements of nuclear materials contained in several shielded cells.

Another aim of the present invention is to offer a device for measuring physical quantities of nuclear materials contained in a shielded cell offering a high precision with regard to the measurements carried out.

DISCLOSURE OF THE INVENTION

The previously formulated aims are attained by a measuring device comprising a transportation flask in which is confined the nuclear material to be measured, the flask being brought up against the cell in which is taken the nuclear material to be measured, this device comprising a casing covering the transportation flask, the casing being equipped with neutron detection sensors. The device can be brought up against and retracted from the shielded cell to be able to carry out measurements of nuclear materials contained in different shielded cells.

The term brought of against (respectively retracted) signifies that the device is temporarily assembled and coupled (respectively disassembled and uncoupled) to the shielded cell, in a sealed manner, so as to introduce or evacuate nuclear materials in said cell, while at the same time ensuring the continuity of the protection of the personnel against irradiation and contamination.

Moreover the device according to the present invention is very easy to dismantle, which enables its transport to different places to carry out measurements of nuclear materials contained in different cells.

It is possible to measure physical quantities of the nuclear material placed inside the transportation flask, the housing of the transportation flask being isolated from the shielded cell during the measurement.

Furthermore, this device does not necessitate the transport of the nuclear material, it enables a measurement of the physical quantities of this material before its transport, which makes it possible to comply with regulatory requirements.

Advantageously, the device comprises a neutron emission module housed in a graphite support on which is placed the flask.

The main subject-matter of the present invention is then a device for measuring physical quantities of nuclear material contained in a shielded cell (2), which device can be brought up against said shielded cell (2) and can be retracted therefrom, said device being intended to carry out the measurement in a position in which it is against the shielded cell, comprising a carriage, a support placed on the carriage, a shielded container containing a transfer container intended to store the nuclear material to be measured, said shielded container being placed on the support, the shielded container comprising an opening intended to be aligned with an opening in one wall of the shielded cell giving access to the nuclear material that it contains, in which said measuring device also comprises a casing covering the shielded container and measurement means fastened to said casing.

The carriage, the support and the shielded container are advantageously capable of being separated to enable an easy dismantling and an assembly of said device with a view to its transport to another shielded cell and its use with said other shielded cell.

Advantageously, the support comprises a housing accommodating a neutron emission or electromagnetic radiation module.

The casing and the support form advantageously a caisson surrounding on five sides the shielded container, the sixth open side enabling communication with the shielded cell, this caisson reflecting the neutrons and confining them.

The casing comprises, for example, two side walls, a bottom intended to be placed opposite the shielded cell in relation to the shielded container and a roof, said bottom comprising an opening to enable the connection of the shielded container to a poker.

For example, two measurement means can be fasten on each side wall on the outside of the casing and two measurement means on the roof on the outside of the casing. The use of two "measurement means" makes it possible to obtain a measurement efficiency greater than the use of a single measurement means. Moreover the arrangement of these means just on the outside of the casing corresponds to the place where the neutron flux to be measured is the strongest.

The measurement means each have an axis, the two measurement means per wall of the enclosure are then advantageously placed so as to have their axes parallel, and the measurement means of two different walls are advantageously orthogonal. This arrangement has the advantage of making it possible to acquire signals from which it will be possible to extract information on the localisation of the material in the transfer container, and thus make their measurement more precise.

The pairs of measurement means are advantageously centred on the target of the emission module, to improve the measurements.

For example, the measurement means comprise several detectors, for example 4 or 7.

The casing and/or the support are advantageously made of graphite, graphite having the property of thermalising the flux of neutrons and reflecting this flux. It may be provided to cover the graphite with an anodised aluminium sheet to improve the mechanical strength and to facilitate decontamination if necessary.

For example, the graphite is UCAR type purified graphite, with the reference CS 49 H.

Advantageously, the measuring device according to the invention comprises a radiological protection covering the assembly formed by the carriage, the shielded container and the casing made of graphite so as to isolate said assembly from the exterior environment. This protection then allows operators to be near to the measuring device.

The radiological protection comprises for example two side walls, a bottom and a roof, a first opening being formed in the bottom of the protection for the passage of supply cables and the control of the emission module and measurement means, said first opening is blanked off by a plug, and a second opening for the connection of the poker, said second opening being blanked off by a plug.

Advantageously, means of guiding the radiological protection in relation to the assembly while the protection is being put in place around the assembly are provided to avoid damaging the assembly.

The subject-matter of the present invention is also a method of assembling the measuring device according to the present invention, comprising the steps:

putting in place the carriage,
putting in place the support on the carriage,
putting in place the shielded container on the support,
putting in place the casing,
putting in place measurement means on the casing.

The method of assembly according to the invention comprises advantageously the step of putting in place the emission module in the support.

This method of assembly may also comprise the later step of putting in place the biological protection.

Another subject-matter of the present invention is a method of measuring with the measuring device according to the invention, comprising the steps:

opening the shielded container,
opening the access door inside the shielded cell,
bringing the transfer container up against the caisson,
withdrawing the plug from the transfer container,
putting in place the nuclear material in the transfer container,
replacing the plug on the transfer container,
replacing the transfer container in the shielded container,
closing the access door inside the shielded cell,
closing the shielded container,
measuring the physical quantities of the nuclear material.

Advantageously, this method comprises "emission-measurement" cycles repeated at a frequency of the order to several tens of Hz, the emission being of neutron or electromagnetic type.

BRIEF DESCRIPTION OF DRAWINGS

The present invention will be better understood with the help of the description that follows and the appended drawings, in which:

FIGS. 3A and 3B are front and side views of an opening key of the transportation flask.

DETAILED DESCRIPTION OF SPECIFIC EMBODIMENTS

Figure 1:
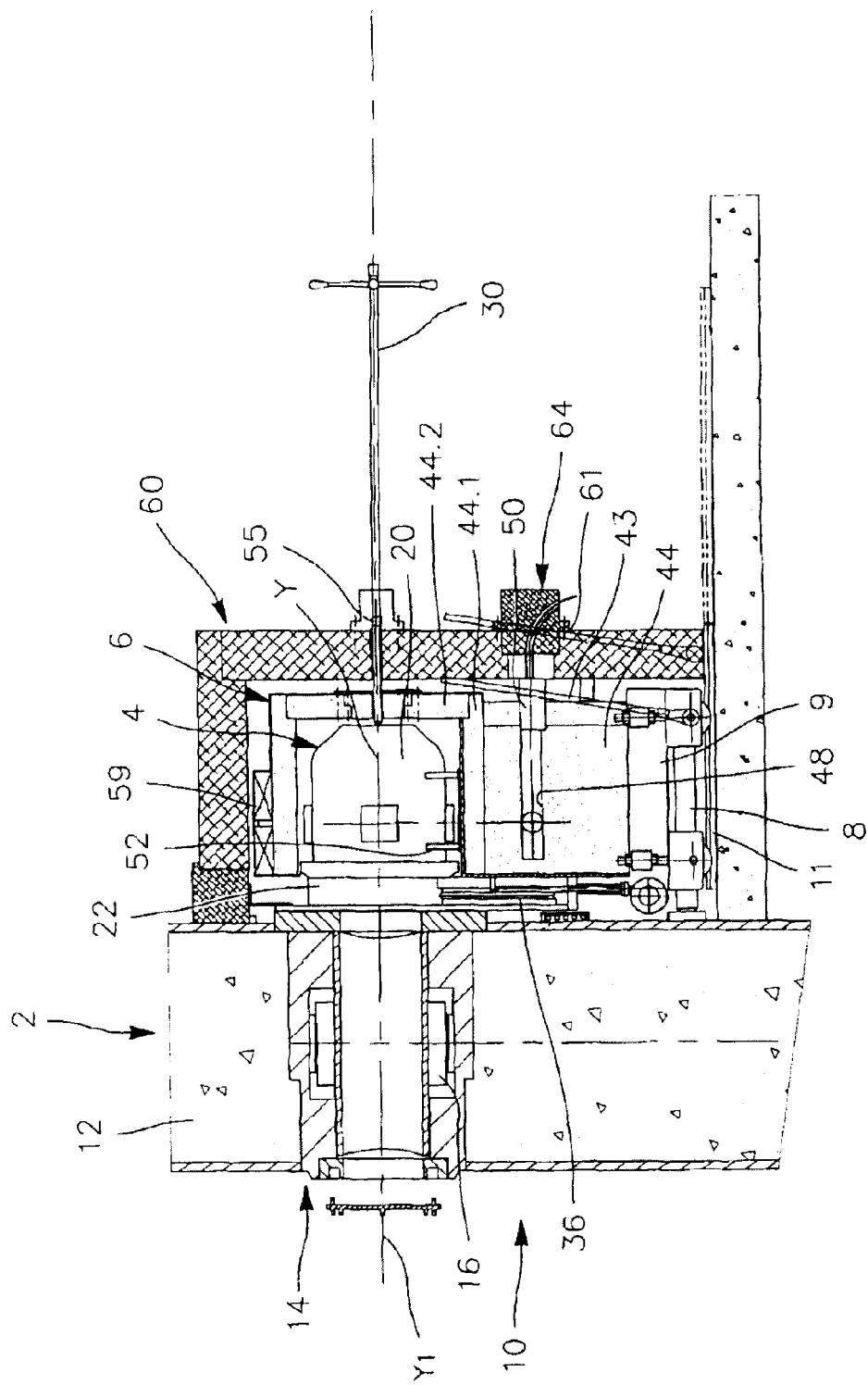
FIG. 1 is a longitudinal sectional view of a measuring device according to the present invention.

In FIG. 1 may be seen the measuring device according to the present invention brought up against a shielded cell 2, of which it is desired to measure the nuclear material.

The measuring device according to the present invention is intended to carry out measurements of the irradiation rate of any type of object, it may be nuclear material, but it may also be any type of object such as an out of service equipment that could be contained in a shielded cell and that it would be necessary to evacuate. Before its evacuation, the irradiation rate of this out of service equipment needs to be measured so as to check that it is less than the legal threshold for the transport of irradiated objects. If the irradiation rate is compliant, the equipment may be transported, for example in the transportation flask having served for the measurement as will be described below.

The measuring device comprises a shielded container 4, intended to contain the nuclear material to be measured and inside of which the measurements will be carried out, a measuring structure 6 surrounding the shielded container 4 and comprising the measurement means, which will be described later, and a moveable carriage 8 enabling the device to be brought up against the shielded cell 2.

The shielded cell 2 comprises a cavity 10, in which is stored the nuclear material (not represented), surrounded by a wall 12 forming the shielding. The wall 12 generally comprises a concrete core covered on both its faces with a lead sheet. Moreover, the cell comprises an access 14 to the cavity 10. This access is formed by a passage of cylindrical shape of circular section of axis Y1, and comprises sealed blanking off means formed, in the example represented, of a door 16, of revolving door type, moveable in rotation around a vertical X axis.

Figure 2:
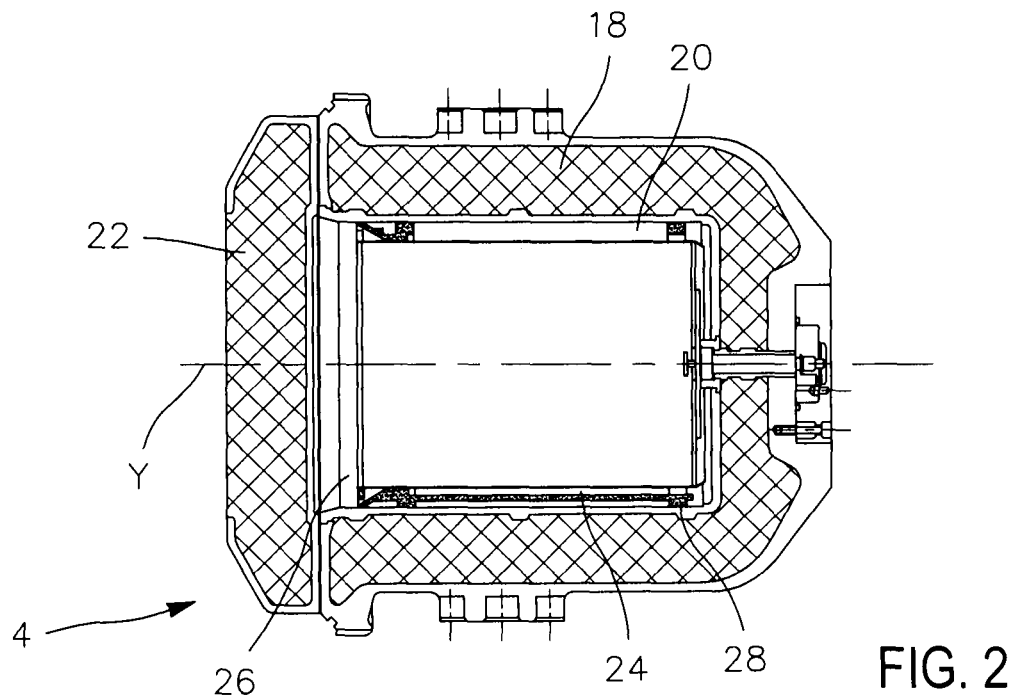
FIG. 2 is a longitudinal sectional view of a transportation flask according to the present invention.
Figure 6:
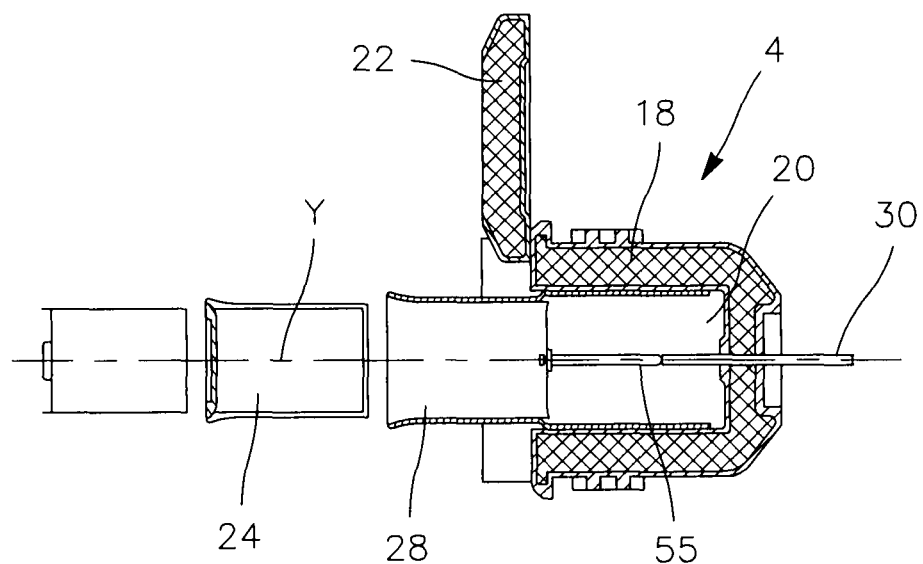
FIG. 6 is a longitudinal sectional view of the transportation flask with the transfer container in different positions.

The shielded container, represented in FIGS. 2 and 6, is of the known type and is for example disclosed in patent application FR 1 515 024. The shielded container is for example the "Padirac" flask type widely used in the nuclear sector.

The shielded container, also called transportation flask, is formed by a body 18 delimiting a chamber 20 of cylindrical shape of Y axis and a removable blanking off device 22.

The body 18 is for example made of lead covered inside and outside by a steel casing.

The blanking off device is for example formed by a door capable of sliding along a direction orthogonal to the Y axis of the chamber 20.

Moreover, a transfer container 24 is placed in the chamber 20, the transfer container 24 being able to be blanked off by a plug 26. The transfer container 24 is of cylindrical shape and is received in a tubular canister 28, itself housed in the chamber 20. The tubular canister 28 is capable of being displaced along the Y axis, to make it possible to take out the transfer container. The canister 28 forms a sealed mechanism of transferring the transfer container 24 from the inside of the flask to the outside of the flask, the displacement of this mechanism being controlled by means of a connecting poker 30 placed outside of the flask. Thus, the transfer mechanism forms an additional protection vis-à-vis the nuclear material.

The connecting poker 30 is of structure known to those skilled in the art and will not be described in detail.

The connecting poker 30 comprises one end intended to hook onto the bottom of the canister 28 to cause its axial displacement along the Y axis by displacement of the poker along the Y axis. In FIG. 1, the connecting poker 30 is in place. The connection to the bottom of the canister 28 is carried out, for example by a rotation of the connecting poker 30 around its axis.

The sliding door 22 is mounted in rails formed in the body 18. The sliding motion of the door 22 is obtained by means of an opening key 36 visible in FIGS. 3A and 3B, its structure is also known to those skilled in the art and will not be described in detail.

The opening key 36, represented in an isolated manner in FIGS. 3A and 3B, comprises a plate 38 provided with a port 40 of dimensions such that the port 40 enables the passage of the transfer container 24. The opening key 36 also comprises means 41 to maintain the door, these being shifted axially in relation to the port 40. The opening key 36 is mounted on the carriage, the flask is put in place so as to place its door on the means 41. During a sliding motion of the opening key 36 orthogonally to the Y axis, the door 22 slides and the port 40 is placed opposite the free end of the chamber 20. The key 36 also ensures the continuity of the protection against irradiation during the opening of the shielded container. A ring is provided for the handling of the opening key 36.

The free end of the chamber 20 is intended to be aligned with the access 14 of the shielded cell. To do this, the Y axis of the chamber is aligned with the Y1 axis of the access 14, so as to form a continuous conduit.

The carriage 8 supporting the flask comprises a horizontal shelf 9, forming a moving support for the device and enabling the device to be brought up against the shielded cell 2. Advantageously, rails 11 are provided to guide the carriage and obtain a precise alignment between the flask and the access 14 of the shielded cell, more particularly between the Y axis of the chamber and the Y1 axis of the access 14.

Advantageously, the shelf 9 is height adjustable in order to facilitate an alignment between the flask 4 and the access 14.

Means 42 for vertically displacing the opening key 36 are provided on the carriage 8. These are advantageously motorised.

Vertical means for guiding the opening key 36 are also provided on the carriage, these guiding means are for example two vertical V-shaped slides.

The means of displacement of the opening key 36 comprise, for example, two vertical screws connected by a crosspiece driving the key vertically. These screws are actuated by an electric motor through the intermediary of angle transmissions.

The electrical box supplying the motor may be mounted on the carriage and the control is, for example, of the portable control box type accessible from the outside of the biological protection. The box is supplied by a cable from a casing implanted on the adjacent wall.

Moreover, over-travel stops are provided to limit the movements of the opening key 36. The stopping in the lower position takes place on a mechanical stop provided on the carriage. Advantageously, the end of travel of the key takes place slightly lower to avoid leaving the screws of the means of displacement 42 under quasi permanent load.

In the event of failure, it is advantageously provided to be able to operate the means of displacement manually, for example by leaving accessible a free end of the motor shaft, to which a crank may be fastened.

The displacement of the carriage 8 may be manual or motorised.

In the case of a manual displacement, means of assisting the displacement are advantageously provided for to facilitate the operating of the carriage. These means of assistance are, for example, formed by a ratchet wrench 43 cooperating with hexagonal forms borne by the wheels of the carriage placed on the side the furthest from the cell. The ratchet wrench is manipulated by the operating personnel. Means may also be provided to limit the adherence of the wheels, the adherence being caused in particular by the weight of the flask.

The ratchet wrench 43 is represented in dashes in FIG. 1, it is obviously understood that it is used before the putting in place of the protection 60.

In the example represented, the device also comprises a support 44 for the flask, formed for example of a parallelepiped made of graphite that participates in the measurement, as will be seen later.

The support 44 is for example fastened to the carriage 8 by means of two screws.

Figure 4:
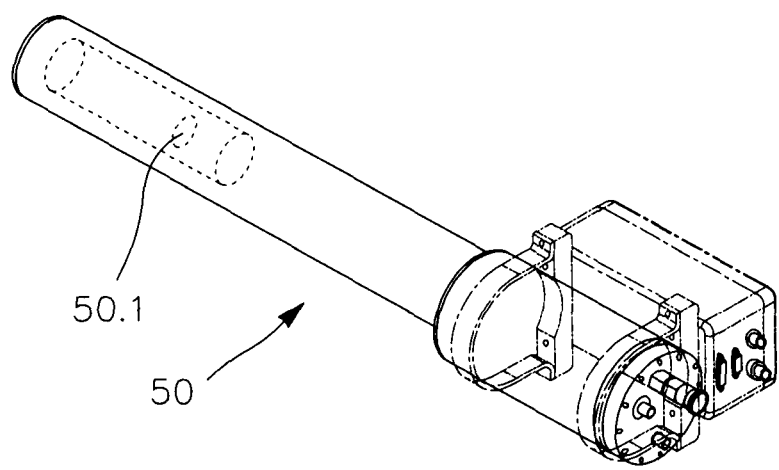
FIG. 4 is a perspective view of an example of a neutron emission module that can be used in the measuring device.
Figure 5A:
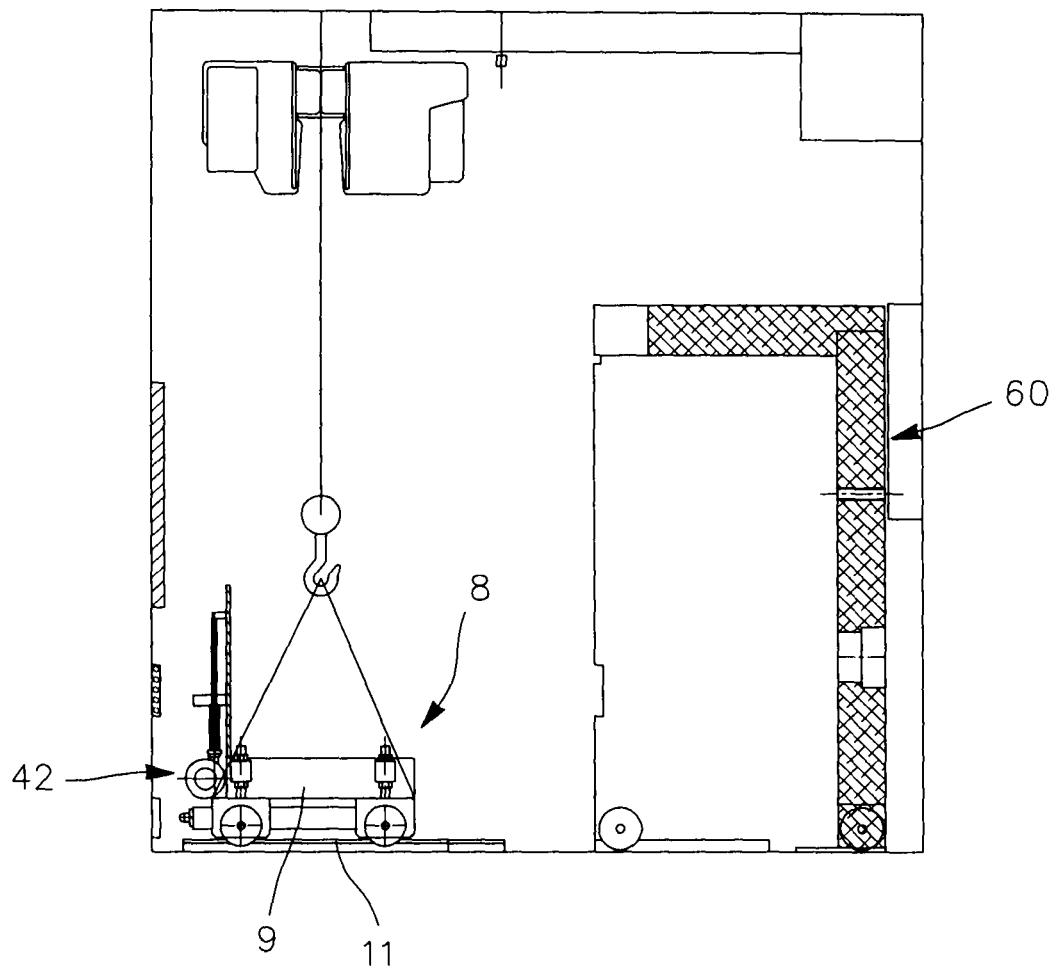
FIGS. 5A to 5G are schematic representations of different steps of putting in place the measuring device according to the present invention on a shielded cell.
Figure 5B:
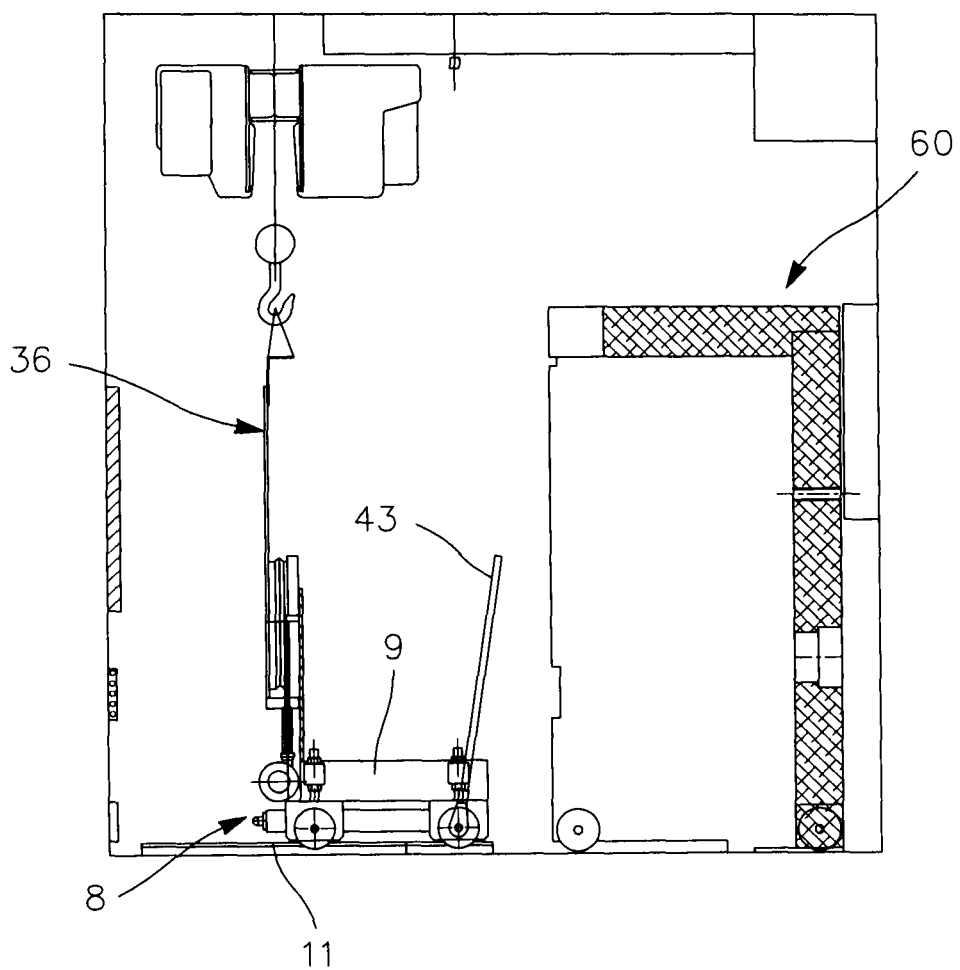
Figure 5C:
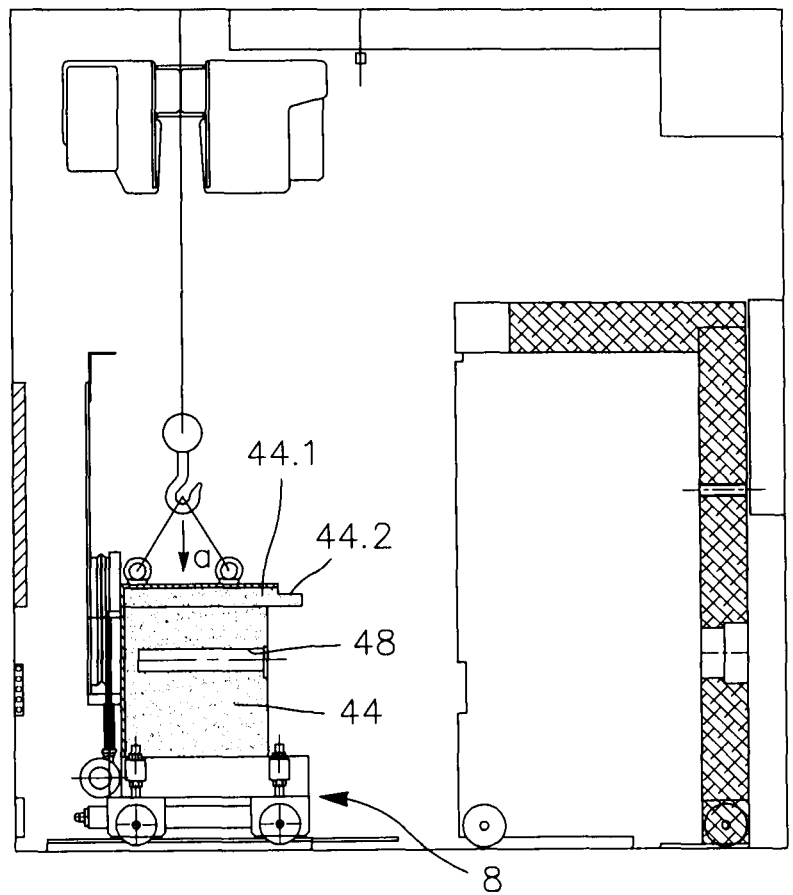
Figure 5D:
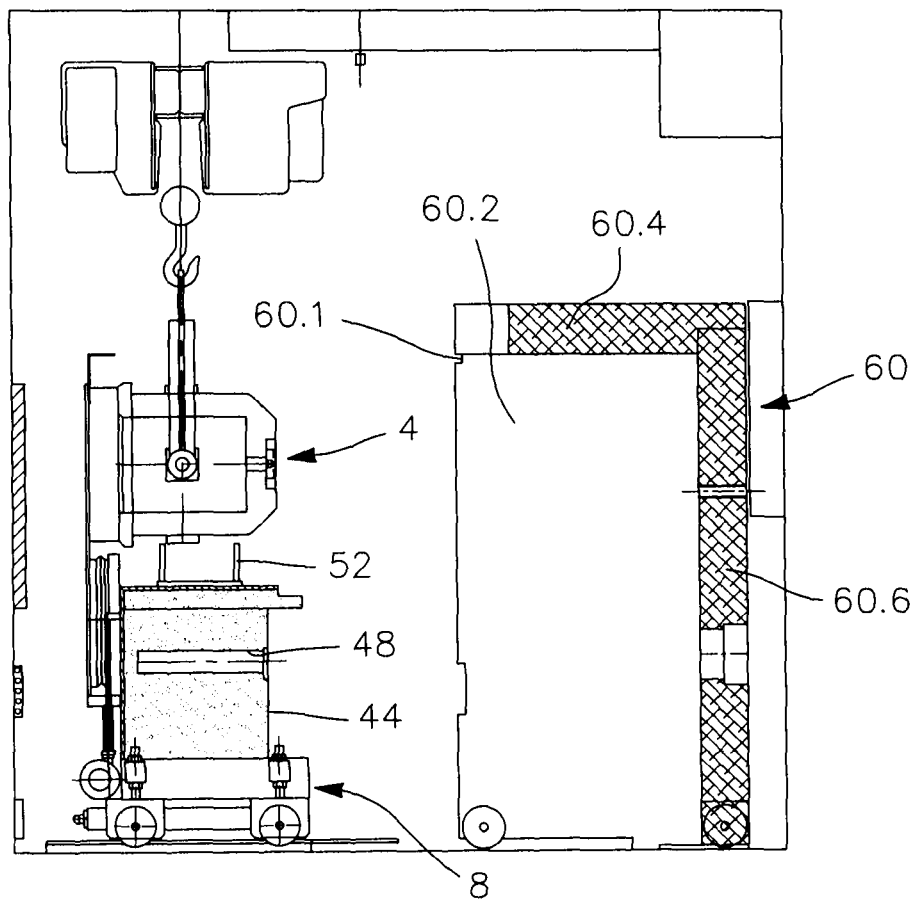
Figure 5E:
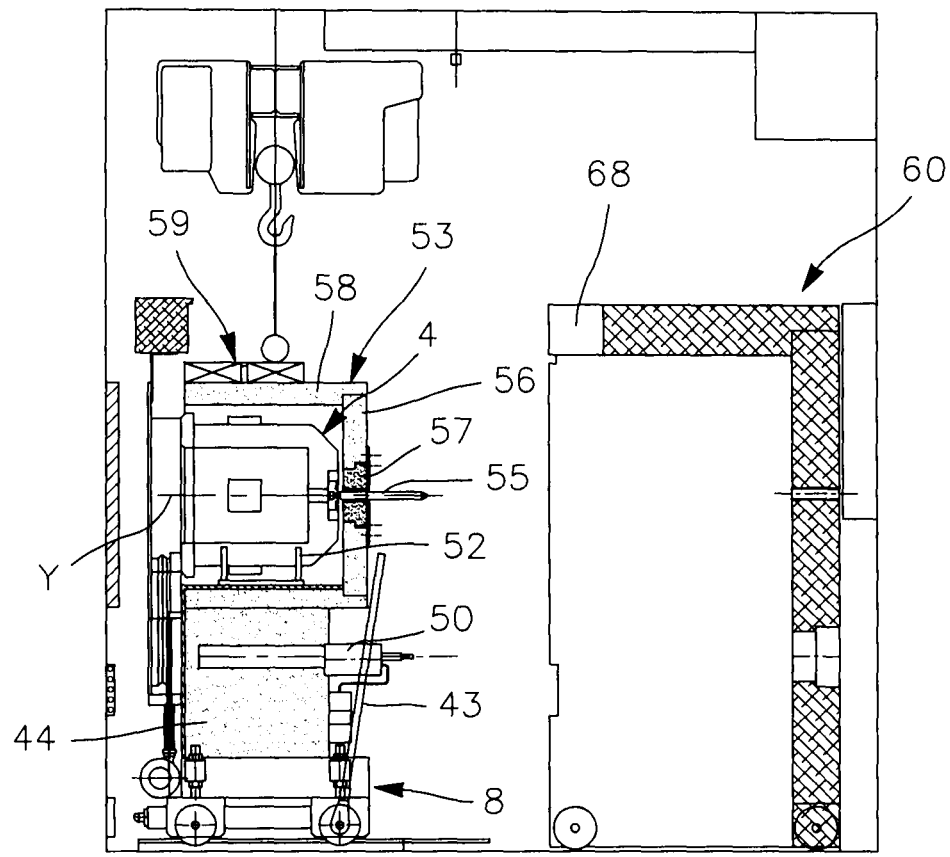
Figure 5F:
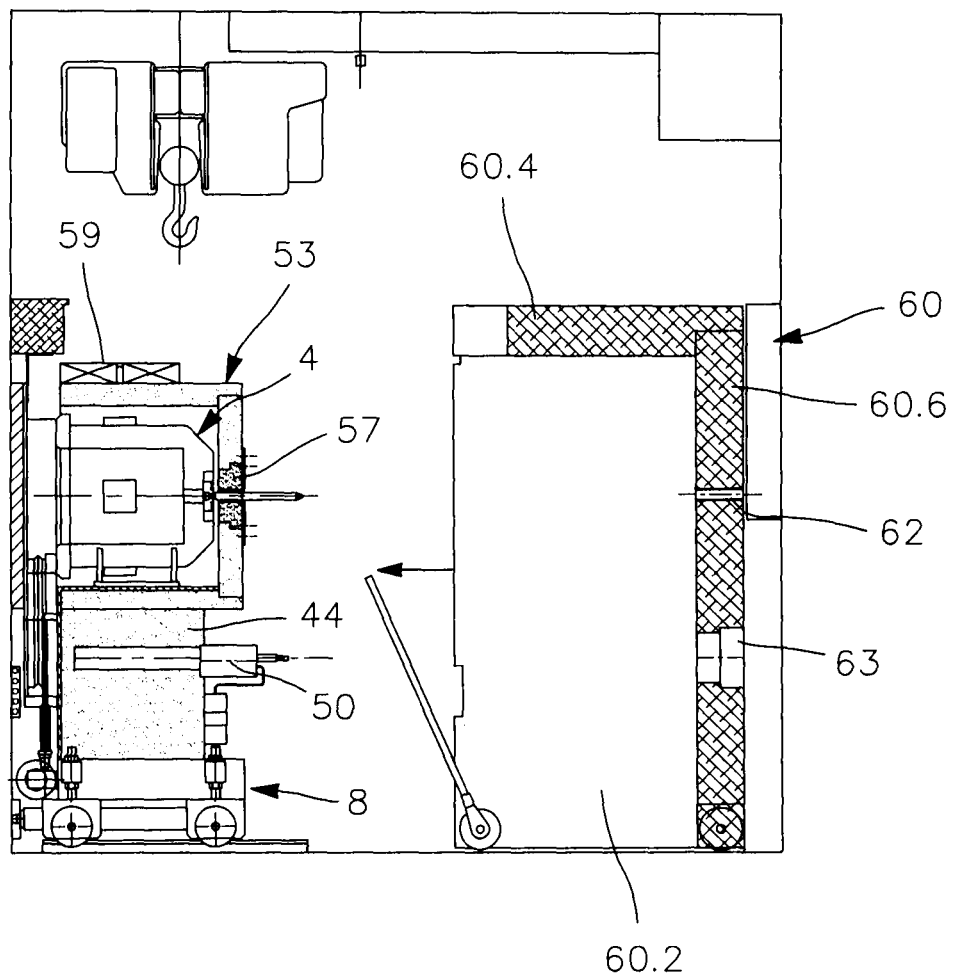
Figure 5G:
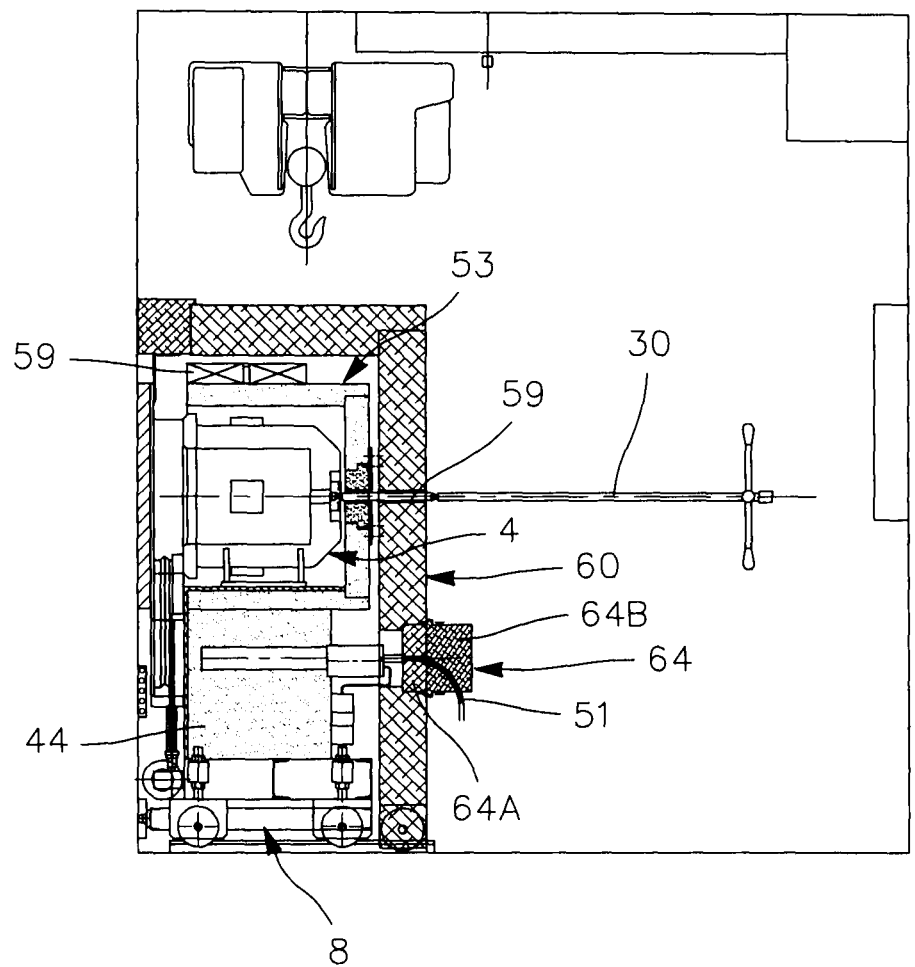

According to the present invention, the graphite support 44 comprises a housing 48 to receive a neutron emission module 50 (not represented in FIG. 1, represented alone in FIG. 4 and represented in the measuring device in FIG. 5G). The housing 48 is of cylindrical shape of circular section, oriented so that its axis is parallel to the axis of the access 14. The housing 48 is non traversing and its opening opens out into the face of the support opposite to that facing the shielded cell. In the neutron emission module, the "neutrogenic" zone 50.1 is virtually point-shaped and is designated by the term "target". In addition, the neutrons are emitted "in all directions". The housing is oriented so that the target 50.1 is centred on the container 24 and on the detection units.

The use of graphite as material for the support of the neutron emission module 50 makes it possible to thermalise the neutron flux, in other words to change the energy spectrum of the neutrons emitted by the module, which are for example emitted at 14 MeV, in order to make them pass into the thermal domain.

Moreover, graphite has the property of reflecting the neutron flux towards the transfer container.

For example, the graphite is UCAR type purified graphite, with the reference CS 49H.

It may be provided to protect the accessible faces of the graphite support by an anodised aluminium casing, just as the cavity accommodating the neutron emission module.

For example, the upper face is equipped with an anodised aluminium sheet of 10 mm thickness to ensure a distribution of the weight of the flask. Indeed, it is this face that is going to support the flask, in particular by a positioning V.

The neutron emission module 50 comprises electrical connections formed by a high voltage cable 51 exiting directly through an opening provided in a biological protection, which will be described later. This cable joins an electrical supply cabinet (not represented) provided outside of the measuring device.

The neutron emission module 50 may also comprise short cables connected to a casing fastened to the face of the support made of graphite opposite the cell, and which can be dismantled rapidly, facilitating the dismantling of the device according to the present invention.

To carry out the measurements, it is also possible to use to an electromagnetic radiation emission module. In the remainder of the description, the module 50 will be designated "emission module".

The output cables from this casing run, for example, inside the biological protection up to the cable outlet opening.

A V-shaped component 52 to maintain the flask is provided on the support 44, the axis of the V being oriented so as to be contained in a vertical plane containing the Y1 axis of the access 14.

According to the present invention, the measuring device also comprises a measurement casing 53 surrounding the flask, onto which the neutron detection units are fastened.

Figure 7:
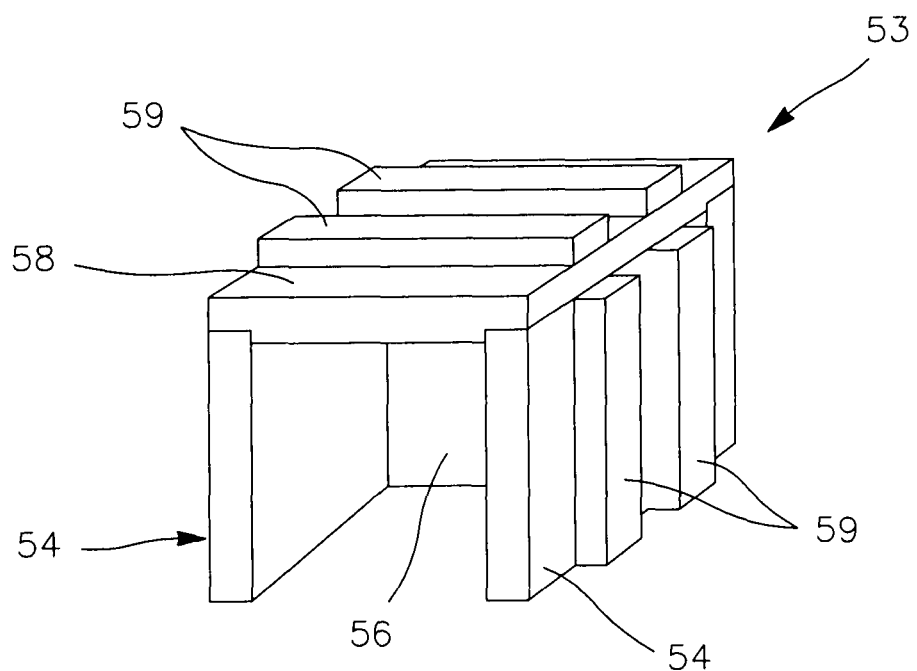
FIG. 7 is a perspective schematic view of a casing according to the present invention represented in an isolated manner.

In the example shown, the casing 53 comprises two side walls (visible in FIG. 7), a bottom 56 orthogonal to the Y axis and a roof 58, made of graphite. The walls 54, 56, 58 are assembled mechanically, for example with screws. The casing comprises advantageously chicanes to minimise radiological leaks, provided at the level of the connection between two walls.

In a particular example, the measuring device comprises six neutron detection units 59 fastened to the outside of the side walls and on the roof.

The outside faces of the side walls 54 and the roof 58 are provided with fastening systems for the detector units. Advantageously, two detection units are fastened to each face. The "measurement means" each comprise an axis. On a same wall, the axes of the measurement means are parallel. The detection means placed on different walls are advantageously placed so as to have their axes orthogonal.

This arrangement makes it possible to acquire signals from which information can be extracted on the localisation of the material in the transfer container 24, and thereby make their measurement more precise.

The pairs of detector units 59 are advantageously centred on the target 50.1 of the neutron emission module, as has been explained previously.

In the upper part of the casing 53, a ring may be provided for the vertical handling of the casing without dismantling. The position of the prehension point is determined with care to avoid any rotation during handling.

In the bottom 56 of the casing 53, an opening 57 enables the connection of an extension of poker 55 on the flask.

The graphite of the casing may be identical to that of the support.

The support 44 may be made for example of polyethylene, lead, boron, etc. for the implementation of other measurement methods specific to other physical quantities.

By way of example, the casing 53 may have a thickness of 100 mm, each face of the casing being coated with anodised aluminium.

In a particularly advantageous manner, the support 44 cooperates with the casing 53, so as to form a caisson of parallelepipedal shape, closed on five sides, the sixth side being open and being brought up against the wall of the shielded enclosure. Thus, the transfer container intended to contain the material to be measured is completely surrounded by graphite. As has already been mentioned, graphite has the property of reflecting the neutron flux, this flux is thus sent back to the transfer container, i.e. to the material, which makes it possible to improve the measurements. Moreover, this caisson improves the confinement of the neutrons.

In the example represented, the support 44 comprises, in its upper part, a shelf 44.1, extending out towards the rear in relation to the part of the support accommodating the neutron emission module 50, which makes it possible to limit the size of the device.

Advantageously, the shelf 44.1 comprises a groove 44.2 housing a lower end of the bottom 56 of the casing 53 which extends out in relation to the side walls, which increases the confinement of the neutrons.

Concerning the bodies of the detection units, these are for example made of polyethylene covered with a sheet of cadmium.

These detector units are, for example, equipped with four or seven detectors while at the same time offering an identical external size.

By way of example, the detection units have the exterior dimensions: 780 mm long, 200 mm wide and 70 mm thick, for a mass of 10 kg.

Each detector unit has a connecting cable to the cabinet, this cable passes via a notch 60.1 provided in the protection 60.

The routing of the cables avoids that they are damaged during the displacement of the biological protection.

The neutron emission module is particularly advantageous because it makes it possible to improve the measurements, but a measuring device comprising detection units without such a module does not go beyond the scope of the present invention.

In one embodiment, provision is made in addition to cover the assembly with a radiological protection 60, also known as biological protection. This protection is for example made of polyethylene with 10% boron.

The protection 60 entirely covers the casing covering the flask, itself placed on the support 44 fastened to the carriage 8. The protection 60 is, moreover, resting against the wall of the shielded enclosure around the access 14, when the device is in measuring position.

The protection 60 comprises two side walls 60.2, a roof 60.4 and a bottom 60.6, assembled mechanically so as to form an assembly all in one piece. Advantageously, the different parts are provided with chicanes to limit radiological leaks, these chicanes are provided at the level of the connection between two walls of the enclosure.

The protection 60 is advantageously mounted on wheels cooperating with rails (not represented) to enable a precise and easy bringing together.

These rails make it possible to avoid the damage of equipment such as the detector units or the extension of the poker, while the protection is being put in place.

The protection 60 may be displaced, like the casing 53, by means of a ratchet wrench 61 cooperating with adapted forms at the level of the wheels.

An over-travel detection device may be provided between the protection 60 and the shielded cell 2 in order to signal the putting in place of the protection 60. This detector is advantageously connected to the system for controlling the neutron emission module 50, to bring about the emergency stop of the module 50 in the event of detection of a change of position of the protection 60.

Means of securing the protection 60 on the wall of the shielded cell 2 are also provided to avoid any untimely displacement, for example by pins.

As already disclosed previously, in the bottom 60.6 of the protection 60, a hatch 63 is also provided in the lower part enabling the connection of the high voltage cable 51 of the neutron emission module 50.

The opening 63 can be blanked off with an additional protection component 64 enabling the passage of the cable from the emission module. The component 64 is a plug, in the example represented this is in two parts, which makes it possible to simplify production.

The plug 64 is composed of a first part 64A comprising a boring of axis substantially parallel to the ground to enable the passage of the high voltage cable 51 and positioning itself without any means of fixation in the opening 63 and a second part 64B comprising a boring with a quarter circle shape, the upper end of the boring extending in the continuation of the boring of 64A and the lower end of the boring being substantially perpendicular to the ground, said boring enabling the passage of the high voltage cable 51. The half-plug 64B is fastened to the protection 60 by means of screws.

The roof 60.4 of the protection 60 is provided on the side of the shielded cell 2 with a notch 68 for the passage for the complimentary key.

An undercut on the side also enables the passage of the shaft for the manual control of the opening key.

The protection 60 allows operators to remain near to the measuring device by isolating them from the radiations caused by the neutron emission module and by those emitted by the nuclear material contained in the flask 4.

The bottom of the protection 60 also comprises an opening 62 for the passage of the poker, aligned with those in the bottom of the casing 53 and the flask 2.

By way of example, the thickness of the walls of the protection 60 is of the order of 200 mm.

A cabinet (not represented) for electronic equipment is also provided containing:
the control module of the neutron emission module,
neutron detector amplifiers,
a computer for managing the measurement.

A device for controlling the putting in place of the radiological protection 60 may also be provided for, this comprising several detectors of the opening of the accesses to the measuring device.

Means for warning in an unequivocal manner of the operation of the neutron emission module 50 are also advantageously provided for, for example these are formed by a revolving warning light.

The assembly and the putting in place of the measuring device according to the present invention near to a shielded cell will now be described, with the objective of carrying out measurements on the nuclear material that it contains, while referring to FIGS. 5A to 5G.

Firstly, the rails 11 are put in place along a direction orthogonal to the wall of the shielded cell 2, in order to ensure the alignment of the flask 4 with the access 14.

The carriage 8 is then put in place on the rails by means of lifting and displacement of a crane (FIG. 5A), of the bridge crane type.

The opening key 36 is then mounted on the carriage 8 at the level of the means of displacement, again by means of a crane (FIG. 5B).

The graphite support is then deposited on the carriage 8, the carriage 8 may be brought closer to the cell before this step (FIG. 5C).

In a following step, the V-shaped support is placed on the graphite support 44, then the transportation flask 4 is deposited on the V-shaped support (FIG. 5D).

The prehension ring of the key is removed and a biological protection part of same nature and thickness as the biological protection 60 is put in place to blank off the undercut of the upper face of the biological protection.

The casing 53 is then put in place around the transportation flask 4, also by means of the crane (FIG. 5E).

The carriage 8 may if necessary be displaced in the direction of the cell 2 before putting the casing 53 in place.

The detector units 59 are mounted on the casing 53 and the emission module 50 is placed in its housing 48 in the support 44.

In a similar manner, the bottom 56 of the casing 53 comprises an opening for the poker 30, provision is made, after assembly of an extension of the poker, to blank off the opening with a plug.

During a following step, the assembly thereby formed is completely brought forward against the shielded cell 2 up to its operating position so that the transportation flask 4 is in front of the access 14 of the cell. The displacement of the carriage 8 is carried out by means of the ratchet wrench 43. The position of the carriage 8 is then locked up against the shielded cell 2 (FIG. 5F).

FIG. 5G shows the radiological protection in place up against the shielded cell 2, the protection 60 has been displaced by means of the ratchet wrench 61. The protection 60 is then fastened to the wall of the cell 2, for example by means of pins.

When the protection 60 is in place, the supply cables of the emission module pass through the opening in the bottom of the protection 60, the opening is blanked off around the cables by means of a plug.

Moreover, the extension of the poker passes through the bottom of the protection 60, the poker 30 is then connected to this extension.

The measuring device is ready to operate, the different steps of operating the device according to the present invention will now be described.

The transfer of the transfer container 24 is carried out in the following manner:

The poker 30 is connected to the transportation flask 4, more particularly to the bottom of the canister 28.

The complementary key is mounted to open the transportation flask 4, by making the door 22 slide.

The revolving door 16 of the shielded cell 2 is pivoted so as to leave the passage free.

The transfer container 24 is then introduced into the shielded cell 2.

The plug of the transfer container 24 is removed, and the nuclear material is laid down in the transfer container 24.

Then, by carrying out the preceding operations in the reverse order, the transfer container 24 is brought back into the transportation flask 4.

The revolving door 16 is made to pivot and the door of the flask 4 is closed by lowering the complementary key.

The measurement then takes place.

Only the measurement units 59 may be used in the case of a passive type measurement, or the neutron emission module may be used before carrying out the measurements to interrogate the nuclear material in the case of an active type measurement. In this latter case, "emission-measurement" cycles are repeated at a frequency of the order of several tens of hertz, the emission being of the neutron or electromagnetic type.

This type of measurement forms part of the general knowledge of those skilled in the art, and is in particular disclosed in the document "Active nondestructive assay of nuclear materials NUREG/CR-0602 SAI-MLM-2585 January 1981" and in "Mesure nucléaire non destructive dans le cycle du combustible" (Non destructive nuclear measurement in the fuel cycle) Part 2 BN 3 406 of "Techniques de l'ingénieur".

At the end of the measurement, the measuring device is dismantled by following the assembly steps in the reverse order.

After the measurement, the nuclear material may be evacuated by the transportation flask to another zone.

The device according to the present invention is modular, its assembly and its dismantling are very easy and may be carried out without tools by personnel without particular skill, other than handling. It makes it possible furthermore to be very easily transported, in the form of separated parts, to different storage sites to carry out control measurements, for example by an international nuclear materials surveillance body. It may be shared between several shielded cells of a same site, and thus avoids having to equip each cell with a measuring device.

The invention claimed is:

1. A movable device for measuring a physical quantity of nuclear material contained in a shielded cell, where the movable device can be brought up against the shielded cell and can be retracted therefrom, and the device is configured to carry out a measurement in a position against the shielded cell, the device comprising:
a carriage;
a support placed on the carriage;
a shielded container comprising a body and a door, wherein
a chamber, which is an interior space of the shielded container, is delimited within the body of the shielded container,
the shielded container is arranged on the support, and
the shielded container includes an opening configured to be aligned with an opening in a wall of the shielded cell to provide the chamber access to the nuclear material stored within the shielded cell;
a measurement casing surrounding the shielded container; and
one or more measurement sensors fastened to an external surface of the measurement casing, wherein
said one or more measurement sensors are configured to measure a physical quantity of the nuclear material stored inside the shielded container when the door of the chamber of the shielded container is closed in such a manner that the shielded container's chamber is closed off from the shielded cell.

2. A device according to claim 1, wherein:
the carriage, the support, and the shielded container are configured to be separated to enable dismantling and an assembly of the movable device to allow its transport to another shielded cell and its use with the other shielded cell.

3. A device according to claim 1, wherein:
the support comprises a housing accommodating one or more of a neutron emission module and an electromagnetic radiation emission module.

4. A device according claim 1, wherein:
the measurement casing and the support form a caisson surrounding on five sides the shielded container, a sixth side being open and enabling communication of the chamber with the shielded cell.

5. A device according to claim 1, wherein:
the measurement casing comprises two side walls, a bottom configured to be placed opposite the shielded cell in relation to the shielded container, and a roof, the bottom comprising an opening to enable connection of the shielded container to a poker.

6. A device according to claim 5, wherein:
a plurality of measurement sensors are fastened to each lateral wall on the external surface of the casing, and
a plurality of measurement sensors are fastened on the roof on the external surface of the casing.

7. A device according to claim 6, wherein:
the plurality of measurement sensors each have an axis, wherein the axis of each measurement sensor has a direction corresponding to the wall of the measurement casing on which the measurement sensor is fastened,
the measurement sensors, of the plurality of measurement sensors, fastened to the same wall of the measurement casing are fastened such that their axes are parallel, and
the measurement sensors, of the plurality of measurement sensors, are fastened such that the axes of the measurement sensors on one wall are orthogonal to the axes of the measurement sensors on at least one other wall.

8. A device according to claim 6, further comprising:
an emission module housed in the support, wherein
the plurality of measurement sensors are centered on a target of the emission module.

9. A device according to claim 7, further comprising:
an emission module housed in the support, wherein
the plurality of measurement sensors are centered on a target of the emission module.

10. A device according to claim 1, wherein the plurality of measurement sensors comprises four or seven sensors.

11. A device according to claim 1, wherein:
the measurement casing and/or the support are made of graphite.

12. A device according to claim 5, wherein:
the measurement casing and/or the support are made of graphite.

13. A device according to claim 11, wherein:
the graphite is UCAR type purified graphite, with reference CS 49 H.

14. A device according to claim 11, wherein:
the graphite is covered with an anodized aluminium sheet.

15. A device according to claim 1, further comprising:
a radiological protection covering an assembly formed by the carriage, the shielded container, and the measurement casing so as to segregate the assembly from an exterior environment.

16. A device according to claim 15, wherein:
the support comprises a housing accommodating one or more of a neutron emission module and an electromagnetic radiation emission module, and
the radiological protection comprises
two side walls,
a bottom,
a roof,
a first opening formed in the bottom of the radiological protection for passage of cables for supplying and controlling the one or more emission modules and the one or more measurement sensors, wherein the first opening is blanked off by a plug, and
a second opening for the connection of the poker, the second opening being blanked off by a plug.

17. A device according to claim 16, further comprising:
means for guiding the radiological protection in relation to the assembly while the radiological protection is being put in place around the assembly.

18. A method of assembling a movable device for measuring a physical quantity of nuclear material contained in a shielded cell, the method comprising:
putting in place a carriage external to the shielded cell, wherein the carriage is configured such that the device may be moved against the shielded cell and retracted therefrom when the device measures the physical quantity of the nuclear material;
putting in place a support on the carriage;
putting in place a shielded container on the support, wherein
the shielded container includes a body and a door,
a chamber, which is an interior space of the shielded container, is delimited within the body of the shielded container, and
the shielded container includes an opening configured to be aligned with an opening in a wall of the shielded cell when the device is moved, via the carriage, to a position against the shielded cell, thereby giving the chamber access to the nuclear material stored within the shielded cell;
putting in place a measurement casing surrounding the shielded container, the measurement casing being configured to allow the transfer of the nuclear material between an inside of the shielded cell and the chamber of the shielded container; and
putting in place the one or more measurement sensors on an external surface of the measurement casing, wherein the one or more measurement sensors are configured to measure the physical quantity of the nuclear material stored inside the shielded container when the chamber of the shielded container is closed by the door in such a manner that the shielded container's chamber is closed off from the shielded cell.

19. A method of assembling according to claim 18, wherein:
the support of the device includes a housing accommodating one or more of a neutron emission module and an electromagnetic radiation emission module, and
the method further comprises putting in place the one or more emission modules in the support.

20. A method according to claim 19, further comprising:
putting in place a radiological protection around an assembly formed by the carriage, the shielded container, and the measurement casing so as to segregate the assembly from an exterior environment.

21. A measurement method employing a movable device for measuring a physical quantity of nuclear material contained in a shielded cell,
arranging a carriage external to the shielded cell, wherein the carriage is configured such that the device may be moved against the shielded cell and retracted therefrom when the device measures the physical quantity of the nuclear material;
arranging a shielded container on a support on the carriage, wherein a chamber is delimited within a body of the shielded container;
opening a door of the shielded container;
opening an access door of the shielded cell;
bringing the shielded container up against the shielded cell by moving the carriage;
aligning an opening corresponding to the chamber of the shielded container with an opening corresponding to the access door of the shielded cell;
putting in place the nuclear material in the shielded container;
closing the access door of the shielded cell;
closing the door of the shielded container; and
measuring the physical quantity of the nuclear material, wherein the measuring is performed by one or more measurement sensors fastened to an external surface of a measurement casing covering the shielded container, said one or more measurement sensors being configured to measure the physical quantity of the nuclear material stored inside the transfer container when the chamber of the shielded container is closed by the door in such a manner that the shielded container is isolated from the shielded cell.

22. A method according to claim 21, wherein:
the support of the measuring device includes a housing accommodating one or more of a neutron emission module and an electromagnetic radiation module, and
the measurement method further comprises emission-measurement cycles repeated at a frequency of the order of several tens of hertz.

\* \* \* \* \*